(12) United States Patent
Liu et al.

(10) Patent No.: US 8,831,084 B1
(45) Date of Patent: Sep. 9, 2014

(54) APPARATUS AND METHOD FOR COMMON MODE TRACKING IN DFE ADAPTATION

(75) Inventors: Wing Liu, Milpitas, CA (US); Mei Luo, San Jose, CA (US)

(73) Assignee: Altera Corporation, San Jose, CA (US)

( * ) Notice: Subject to any disclaimer, the term of this patent is extended or adjusted under 35 U.S.C. 154(b) by 187 days.

(21) Appl. No.: 13/609,173

(22) Filed: Sep. 10, 2012

(51) Int. Cl.
*H03H 7/40* (2006.01)

(52) U.S. Cl.
USPC .......................... 375/233; 375/350; 708/323

(58) Field of Classification Search
USPC .......... 375/229, 232, 233, 346, 350; 708/322, 708/323
See application file for complete search history.

(56) References Cited

U.S. PATENT DOCUMENTS

| | | | |
|---|---|---|---|
| 6,794,929 B2* | 9/2004 | Pelly | 327/552 |
| 2012/0044100 A1* | 2/2012 | Zeller | 341/110 |

* cited by examiner

*Primary Examiner* — Dac Ha
(74) *Attorney, Agent, or Firm* — Guadalupe M. Garica

(57) ABSTRACT

In an embodiment of the present invention, a feedback technique is used to track a reference signal with a DFE summing node common mode voltage. For example, in an embodiment implemented in CML, the feedback signal shifts both differential signals (e.g., the summing node common voltage and the reference voltage) by the same amount. In such an embodiment, the feedback technique preferably changes the reference common mode but not its differential mode.

23 Claims, 5 Drawing Sheets

US 8,831,084 B1

APPARATUS AND METHOD FOR COMMON MODE TRACKING IN DFE ADAPTATION

FIELD OF THE INVENTION

The present invention generally relates to the field of digital communications. More particularly, the present invention relates to decision feedback equalization as implemented in digital communications.

BACKGROUND OF THE INVENTION

Decision Feedback Equalization (DFE) is based on the principle that once the value of the current transmitted symbol has been determined, the contribution of intersymbol interference (ISI) to future received symbols can be removed. DFE has a nonlinear feature that is due to a decision device that attempts to determine which symbol of a set of discrete levels was actually transmitted. Once the current symbol has been decided, a filter structure calculates the ISI effect it would tend to have on subsequent received symbols and, thereafter, compensate the input to the decision device for subsequent samples. This post-cursor ISI removal is accomplished by the use of, among other things, a feedback filter structure.

As part of the implementation of DFE in current mode logic (CML), for example, a DFE adaptation is implemented wherein a DFE summing node common mode voltage changes with DFE feedback coefficients. More particularly, because current generally increases as DFE feedback coefficients are increased, so does the common mode voltage. But in such an implementation, the reference signal common mode is fixed thus creating a problem. For example, where an error sense amplifier is typically implemented, the output of such error sense amplifier will not only depend on the differential signal amplitude as desired, but it will also depend on the increased common mode difference, an undesirable effect. In certain situations, such a result impedes or prevents the convergence of DFE adaptation.

SUMMARY OF THE INVENTION

There exists a need in the art for a DFE circuit with reduced common mode difference between a summing node and a reference node. There is a further need to provide reduced common mode difference using relatively lower speed components than are used for DFE adaptation and other components of a DFE implementation.

In an embodiment of the present invention, a feedback technique is used to track a reference signal with a DFE summing node common mode voltage. For example, in an embodiment implemented in CML, the feedback signal shifts both differential signals (e.g., the summing node common voltage and the reference voltage) by the same amount. In such an embodiment, the feedback technique preferably changes the reference common mode but not its differential mode.

In another embodiment of the present invention, components are implemented in the feedback technique so as to compensate for RC effects introduced by the feedback technique. For example, when implemented in CML, the differential nodes of the reference voltage (e.g., Vrefp and Vrefn) may receive their signals at different times because of RC effects of the feedback technique. So as to account for these effects, matching RC characteristics are implemented as part of the circuitry that generates the reference voltages. For example, where resistors implemented as part of the feedback technique introduce RC effects, such RC effects are matched by implementing similarly configured resistors as part of the circuitry that generates the reference voltages.

These and other embodiments can be more fully appreciated upon an understanding of the detailed description of the invention as disclosed below in conjunction with the attached figures.

BRIEF DESCRIPTION OF THE DRAWINGS

The following drawings will be used to more fully describe embodiments of the present invention.

DETAILED DESCRIPTION OF THE INVENTION

The following description is of certain preferred embodiments presently contemplated for carrying out this invention. This description is made for the purpose of illustrating the general principles of this invention and is not meant to limit the inventive concepts claimed herein.

The operation of a DFE can be generally understood as follows. Assuming that a channel is linear time-invariant (LTI), intersymbol interference (ISI) can be described as a deterministic superposition of time-shifted smeared pulses. Advantageously, the DFE uses information about previously received bits to cancel out their ISI contributions from the current decision. In general, a DFE is implemented to remove post-cursor ISI, e.g., the ISI introduced from past bits.

Figure 1:
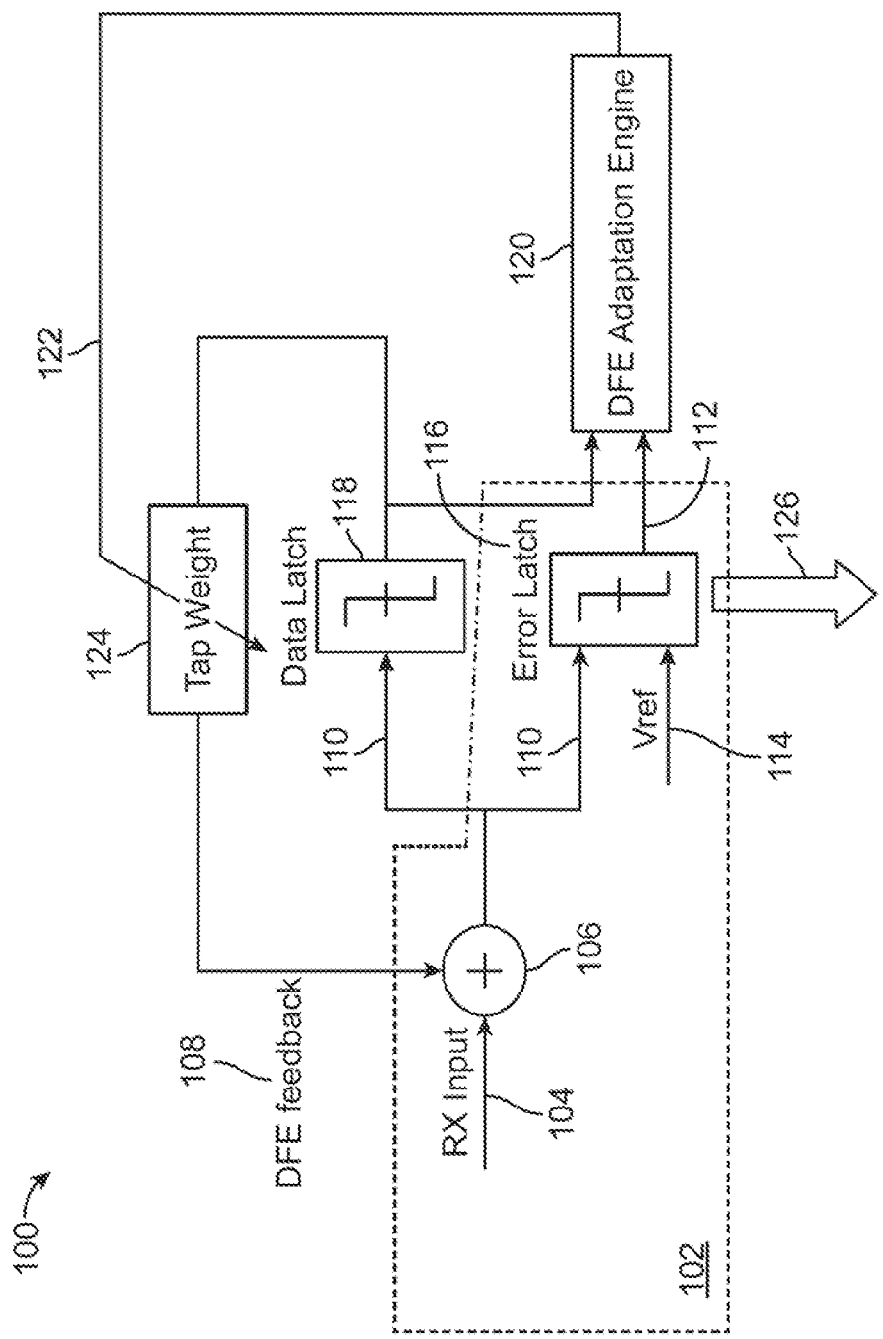
FIG. 1 is a block diagram of a decision feedback circuit on which embodiments of the present invention can be implemented....

Shown in FIG. 1 is a block diagram for Decision Feedback Equalizer (DFE) adaptation circuit 100 on which certain aspects of the present invention may be practiced. An aspect of DFE adaptation circuit 100 is that it automatically adapts to time-varying properties of the communication channel and the received RX input 104. As shown, RX input 104 is summed with DFE feedback signal 108 to generate signal 110 that is input to both data latch 118 and error latch 116. Error latch 116 further receives a reference signal Vref 114 to which signal 110 is compared. Error latch output signal 112 is, therefore, dependent on the level of signal 110 relative to Vref 114. Error latch output signal is input to DFE Adaptation Engine 120. DFE adaptation engine also receives as input data latch output signal 118. Data latch output signal 118 is generated by latching the received signal 110. DFE Adaptation Engine, using inputs as error latch output signal 112 and data latch output signal, then provides an output DFEAE signal 122 that is used to set the various weights of Tap Weight block 124. Using data latch output signal 118 with the appropriate weighting as set by Tap Weight Block 124, DFE feedback signal 108 is generated. In this way DFE adaptation circuit is essentially a filter that uses feedback of detected symbols (e.g., data latch output signal 118) in addition to conventional equalization of future symbols to automatically adapt to time-varying properties of the communication channel.

In operation where there is no intersymbol interference (ISI), the received signal level 104 should substantially be the same as reference voltage 114. But because of ISI that is seen in many practical applications, a low frequency signal is observed that creates a received signal 104 that is larger than reference voltage 114, and a high frequency signal is observed that creates a received signal 104 that is lower than reference voltage 114. In operation, the comparison output 112 from Error Latch 116 is used by DFE adaptation engine 120 to determine if higher DFE gain is required (e.g., change tap weights). But any wrong decision of Error Latch 116 such as caused by the low frequency and high frequency effects discussed above can create problems with convergence of the DFE adaptation.

Figure 2:
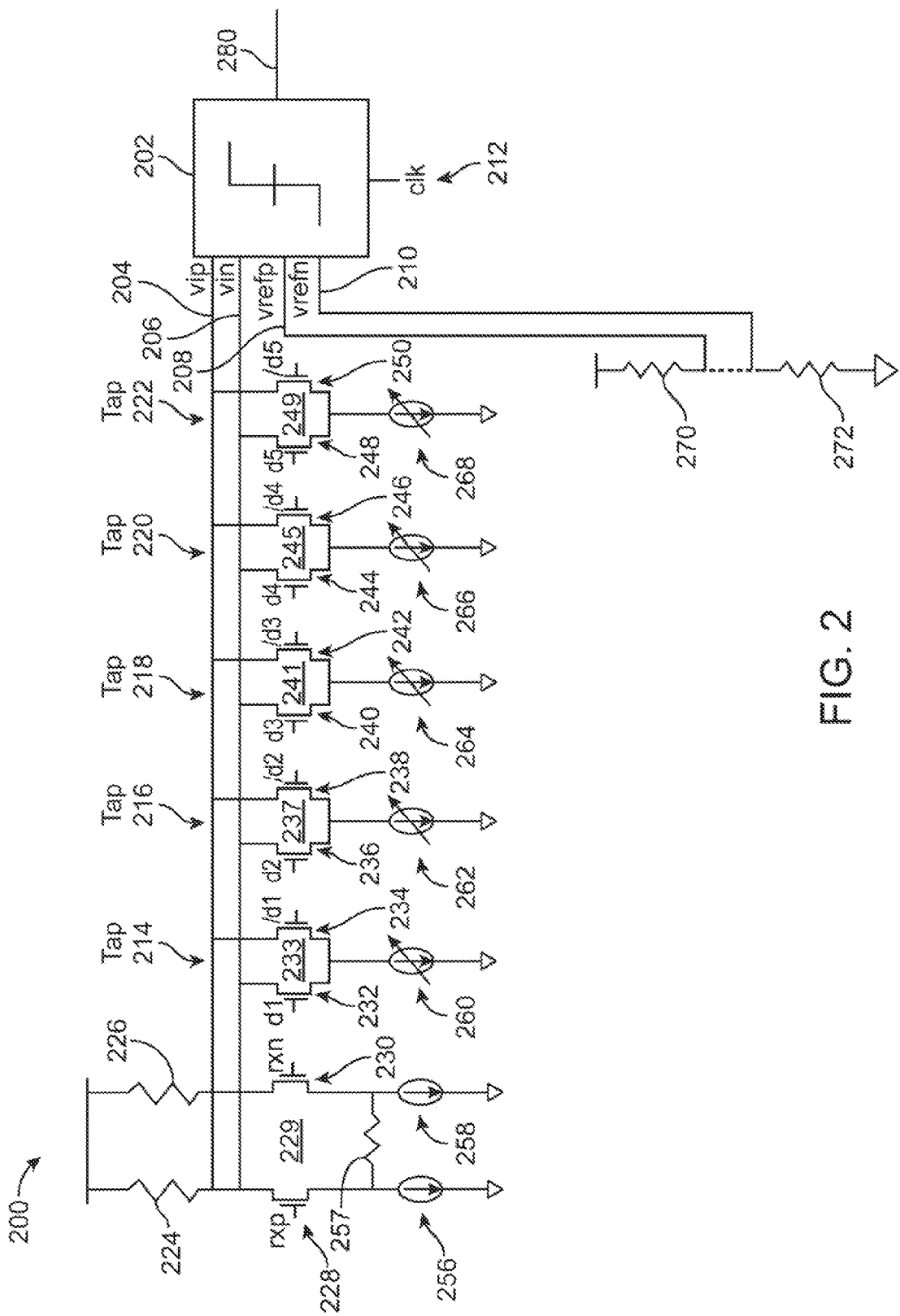
FIG. 2 is a current mode logic (CML) implementation of aspects of a decision feedback circuit on which embodiments of the present invention can be implemented.

Certain aspects of an embodiment of the present invention will be further described with reference to components within block 102 of FIG. 1. Generally shown in FIG. 2 are implementations of components comprising block 102 of FIG. 1. More particularly, the components shown in FIG. 2 are a Current Mode Logic (CML) implementation of the components comprising block 102.

For example, as shown, Error Latch 202 is a CML implementation that receives differential signal vip 204 and vip 206 that generally correspond to signal 110 of FIG. 1. Moreover, Error Latch 202 receives differential signals vrefp 208 and vrefn 210 that generally correspond to Vref signal 114 of FIG. 1. As shown, Error Latch 202 further receives clocking signal clk 212 which was not shown in FIG. 1.

At this point, it should be noted that the figures as contained herein are intended to assist in the understanding of the present invention by one of ordinary skill in the art. As such, block diagrams and circuits are presented with a level of detail that assists in understanding aspects of the present invention while not overburdening the present disclosure with unnecessary details that are within the understanding of one of ordinary skill in the art.

Further shown in FIG. 2 is the manner in which received differential signals rxp 228 and rxn 230 are summed with outputs of various outputs of a tap weight block. As shown, the tap weight block of FIG. 2 comprises six taps 214-222. More particularly, the inputs to tap 214 are the differential signals d1 232 and /d1 234 that are input to differential amplifier 233. The tap weight of tap 214 is substantially set by variably changing the current of current source 260. The operation of taps 216-218 operate substantially similarly to the description of the operation of tap 214.

Also shown in FIG. 2 is the manner in which received signals rxp 228 and rxn 230 are summed with the outputs of taps 214-222. As shown, differentials signals rxp 228 and rxn 230 are input to differential amplifier 229 that further comprises resistors 224, 226, and 257 as well as current sources 256 and 258. As would be understood by those of ordinary skill in the art the gain of differential amplifier is set by, among other things, the values of resistors 224, 226, and 257.

As configured, nodes vip 204 and yin 206 are a summing node that sum the differential outputs of differential amplifiers 229, 233, 237, 241, 245, and 249. Thus, the described circuitry operates as a summing stage that is used to add the received signal (e.g., differential signals rxp 228 and rxn 230) with the DFE feedback signal (e.g., outputs of taps 214-222).

In operation, the output of the summing stage (e.g., vip 204 and yin 206) is compared with a reference voltage (e.g., vrefp 208 and vrefn 210) by Error Latch 202 that acts as an error sense amplifier latch. In application, the reference voltage (e.g., vrefp 208 and vrefn 210) is preferably approximately the targeted amplitude level for the received signal (e.g., rxp 228 and rxn 230).

In operation, where there is no intersymbol interference (ISI), the received signal level (e.g., rxp 228 and rxn 230) should substantially be the same as reference voltage (e.g., vrefp 208 and vrefn 210). But because of ISI that is seen in many practical applications, a low frequency signal is observed that is larger than reference voltage (e.g., vrefp 208 and vrefn 210) and a high frequency signal is observed that is lower than reference voltage. In operation, the comparison output 280 from error sense amplifier latch 202 is used by the DFE adaptation engine 120 to determine if higher DFE gain is required. But any incorrect decision of the error sense amplifier such as caused by the low frequency and high frequency effects discussed above, can lead to problems with convergence of the DFE adaptation.

In a typical DFE implementation, the DFE tap-weights of Tap Weight block 124 are set to zero before DFE adaptation is initiated. At this point, the summed signal (e.g., vip 204 and yin 206) and the reference signal (e.g., vrefp 208 and vrefn 210) have the same common mode. But after DFE adaptation is initiated and the DFE tap-weights increase, for example, higher current through the various taps (e.g., higher current through current sources 260-268 of FIG. 2) will pull down the summing stage common mode. Because of the characteristics of the high speed Error Latch 202, substantial common mode differences in the inputs (e.g., differences between inputs 204/206 and 208/210) will affect the amplitude comparison result of the sense amplifier typically found within Error Latch 202. Embodiments of the present invention address this issue.

Figure 3:
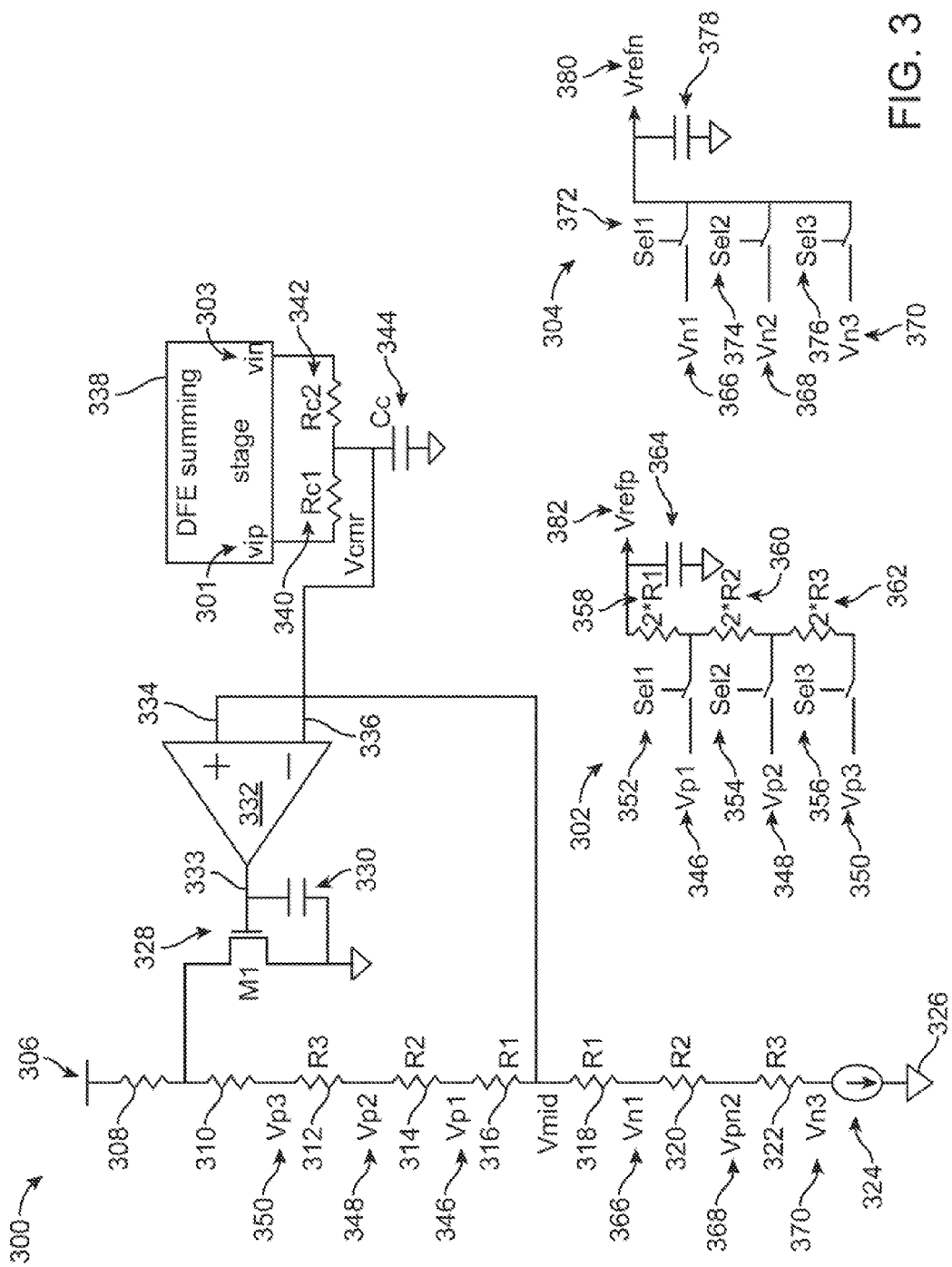
FIG. 3 is a feedback technique for reducing differences in common mode voltage according to an embodiment of the present invention.

In an embodiment of the invention, a feedback scheme is implemented in a manner such as shown in FIG. 3. As shown, common mode feedback circuit 300 comprises resistors Rc1 340 and Rc2 342 and capacitor Cc 344 that are used to generate the common mode voltage of DFE summing stage 338. In an application, DFE summing stage 338 is substantially as shown for the summing stage of FIG. 2 but one of ordinary skill in the art will appreciate that many other implementations are possible.

The operation of RC components Rc1 340, Rc2 342, and Cc 344 can be seen as a first order low pass filter that is tuned to allow the common mode signal to pass while rejecting other higher frequency signals that are not necessary for the present purposes. In an embodiment, a first order low pass filter has been found to operate substantially well. Advantageously, such a first order low pass filter can be implemented without substantial issues in many circuits. Many other filter schemes are possible, however, as would be known to those of ordinary skill in the art.

As further shown in FIG. 3, the filtered output is common mode voltage Vcmr 336. In an embodiment, common voltage Vcmr 336 is compared to a reference common mode voltage Vmid 334 using operational amplifier 332. In the embodiment of FIG. 3, the output 333 of operational amplifier 332 will adjust the gate voltage of transistor M1 328 so that both common mode voltages (e.g., Vcmr 336 and Vmid 334) are substantially the same.

In an embodiment of the present invention, a resistor ladder is used in combination with certain switching so as to configure different reference levels for an error latch such as Error Latch 116 or 202. For example, as shown in FIG. 3 as an embodiment of the present invention, Vrefp circuit 302 is configured to generate a positive reference voltage Vrefp 382 and Vrefn circuit 304 is configured to generate a negative reference voltage Vrefn 380. Note that Vrefp circuit 302 and Vrefn circuit 304 implement switches that, in an embodiment, are used in pairs. In an alternative embodiment, Vrefp circuit 302 and Vrefn circuit 304 are implemented independently.

An example will be used to demonstrate their operation in conjunction with common mode feedback circuit 300. As shown, Vrefp circuit 302 and Vrefn circuit 304 implement three switches that are used in pairs. For example, a first positive reference voltage Vp1 346 is intended to be used in conjunction with a first negative reference voltage Vn1 366. Voltages Vp1 346 and Vn1 366 are generated by the operation of the resistor ladder comprising resistors 308-322 in combination with current source 324. Note that in such resistor ladder, resistors 316 and 318 are of the same value R1, resistors 314 and 320 are of the same value R2, and resistors 312 and 322 are of the same value R3 so as to create predetermined differences in voltage between for complementary nodes. For example, in the embodiment shown in FIG. 3, voltage Vp1−Vmid is substantially the same as the voltage Vmid−Vn1. Likewise, the voltage Vp2−Vmid is substantially the same as the voltage Vmid−Vn2. And, the voltage Vp3−Vmid is substantially the same as the voltage Vmid−Vn3.

In an embodiment it is desirable to use: voltage Vp1 346 in conjunction with voltage Vn1 366; voltage Vp2 348 in conjunction with voltage Vn2 368; and voltage Vp3 350 in conjunction with voltage Vn3 370. To do this in an embodiment of the present invention, various select switches are implemented. For example, to make use of voltages Vp1 346 and Vn1 366, Sel1 switch 352 and Sel1 switch 372 are activated. Similarly, Sel2 switch 354 and Sel2 switch 374 are activated to make use of voltages Vp2 348 and Vn2 368, and Sel3 switch 356 and Sel2 switch 376 are activated to make use of voltages Vp3 350 and Vn3 370.

In an embodiment of the present invention, it has been found that certain changes in the current through transistor M1 328 can affect the generation of optimized reference levels. More particularly, it was found that when the reference common mode changes as current in M1 changes, the differential reference level may change temporarily because a common mode signal travels though different RC paths to generate Vrefp 382 and Vrefn 380. An embodiment of the present invention that addresses this issue matches the RC delays though the various paths by implementing matching resistors after the switches 352-356 in Vrefp path.

For example, as shown in Vrefp circuit 302 when Sel1 switch 352 in activated, the RC characteristics of resistor 358 with a value of 2*R1 substantially matches the effects of resistors 316 and 318 of the resistor ladder that each have a value of R1 for a total of 2*R1. Thus, when implemented using substantially similar semiconductor processing techniques, the RC characteristics of resistor 358 substantially match the combined RC characteristics of resistors 316 and 318. Likewise, the RC characteristics of resistor 360 having a value 2*R2 substantially matches the combined RC characteristics of resistors 314 and 320 each having a value R2. Note that when Sel2 switch 354 is activated, resistors 360 and 358 are placed in series with Vrefp 382 to match the effects seen between the voltages Vp2 348 and Vn2 368. The implementation of resistor 362 having a value 2*R3 is likewise intended to compensate for the RC characteristics of resistors 312 and 322 each having a value R3.

In an embodiment of the present invention as shown in FIG. 3, capacitors 364 and 378 were implemented so as to reduce the effects of certain high frequency noise. The applicability of capacitors 364 and 378 can vary as would be understood by those of ordinary skill in the art. For example, depending on the noise at issue, other filtering schemes can be implemented.

Figure 4:
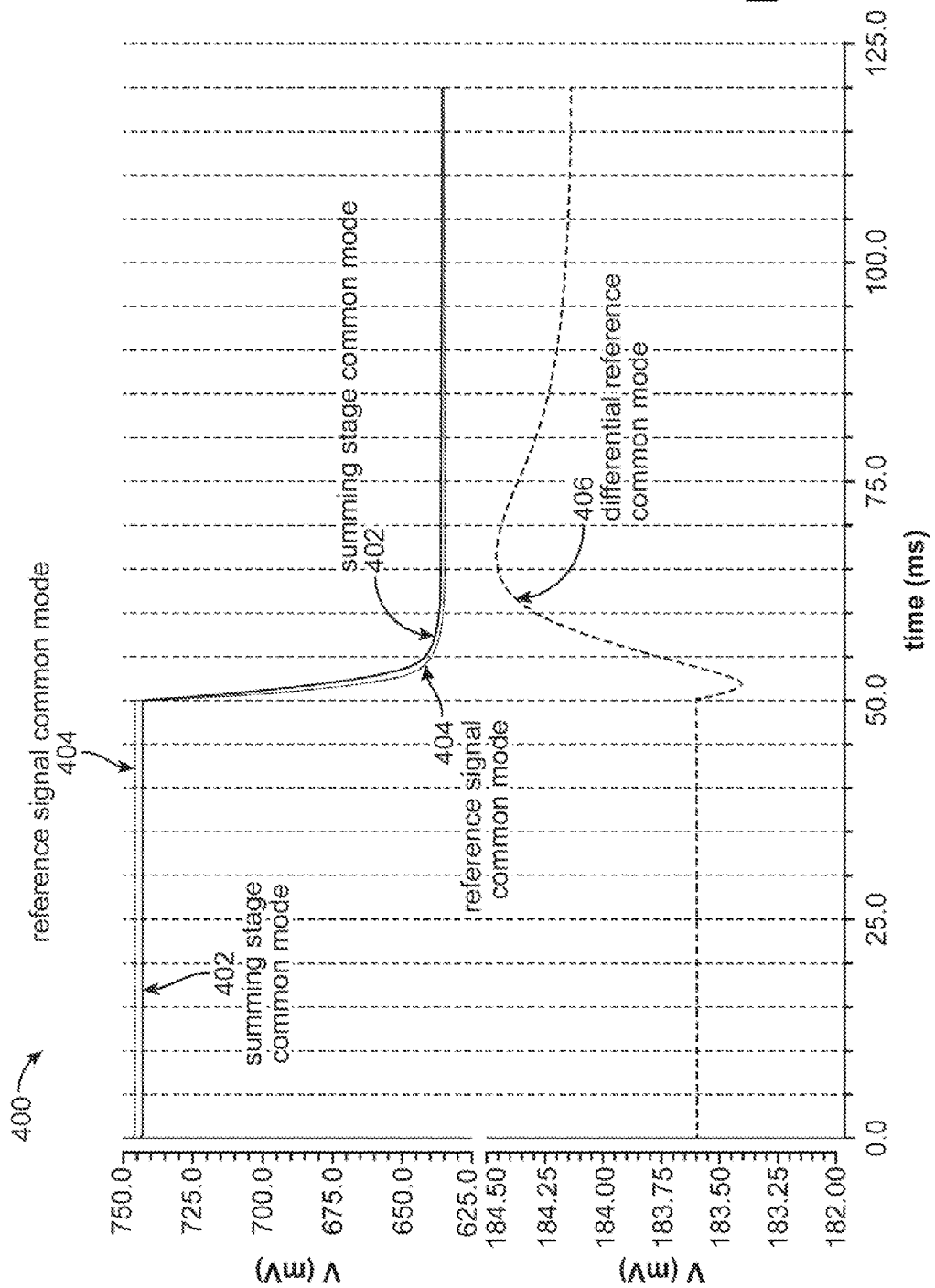
FIG. 4 is a graph of results from a simulation of a feedback technique for reducing differences in common mode voltage according to an embodiment of the present invention.

To validate the operation of an embodiment of the present invention, simulations were conducted as shown in FIG. 4. The results show that the reference common mode can track the common mode variation in summing stage (compare summing stage common mode trace 402 with reference signal common mode trace 404 for time <50 ms). Also, in situations where when common mode voltage is changing (see trace 406 for time >50 ms), only a very small change in differential mode voltage is observed (<1 mV glitch in differential mode for 130 mV common mode change; compare summing stage common mode trace 402 with reference signal common mode trace 404 for time >50 ms). This desirable effect is made possible by matching the RC characteristics in the Vrefp and Vrefn paths as described above.

Figure 5:
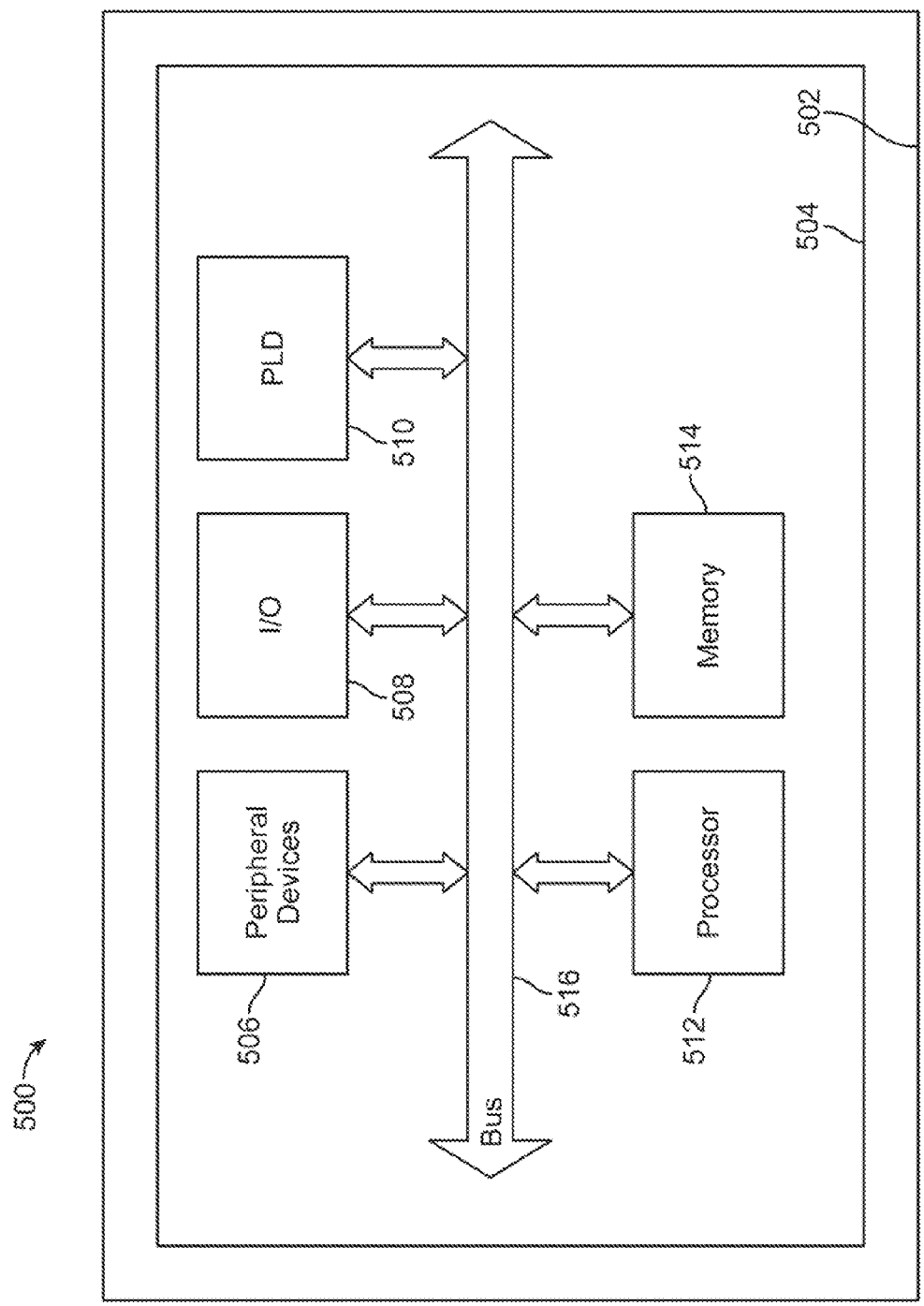
FIG. 5 is a simplified block diagram of an illustrative system employing a programmable logic device incorporating embodiments of the present invention.

An embodiment of the present invention is intended for implementation in a programmable logic device that can be implemented in a data processing system 500 such as shown in FIG. 5. Data processing system 900 may include one or more of the following components: processor 512; memory 514; I/O circuitry 508; and peripheral devices 506. These components are coupled together by system bus 516 and can be populated on a circuit board 504 which is contained in an end-user system 502.

System 500 can be used in a wide variety of applications, such as computer networking, data networking, instrumentation, video processing, digital signal processing, or any other application where the advantage of using programmable or reprogrammable logic is desirable. PLD 510 can be used to perform a variety of different logic functions. For example, PLD 510 can be configured as a processor or controller that works in cooperation with processor 512. PLD 510 may also be used as an arbiter for arbitrating access to a shared resource in system 500. In yet another example, PLD 510 can be configured as an interface between processor 512 and one of the other components in system 500. It should be noted that system 500 is only exemplary, and that the true scope and spirit of the invention should be indicated by the following claims.

Various technologies can be used to implement PLDs 510 as described above and incorporating this invention. And although the invention has been described in the context of PLDs, it may be used with any programmable integrated circuit device.

Embodiments of the invention may be implemented entirely in hard logic (e.g., dedicated specialized logic of the programmable device) on the programmable device or soft logic (e.g., logic created using the programmable logic resources of the programmable device), or a combination of soft and hard logic. For example, a combined embodiment could place circuitry that is required to operate at high speed in hard logic and and slower operating functionality in soft logic.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

In describing the present invention, it has been shown that embodiments of the present invention track in a desirable way the reference signal common mode with the DFE summing node common mode. It has been observed that the amplitude of the differential signal is not changed. Also, because of the matched RC characteristics, no undesirable glitches were observed in the reference differential signal level when its common changes.

It should be appreciated by those skilled in the art that the specific embodiments disclosed above may be readily utilized as a basis for modifying or designing other write elements. It should also be appreciated by those skilled in the art that such modifications do not depart from the scope of the invention as set forth in the appended claims.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A decision feedback equalization circuit, comprising:
   a low pass filter coupled to a summing node of the decision feedback equalization circuit;
   a comparator receiving a first and second input, wherein the first input is a signal from the low pass filter and the second input is a signal from a resistor ladder, wherein the comparator is configured to reduce a difference between its first and second inputs;
   a resistor ladder configured to generate the second input and further configured to generate at least one reference signal; and
   an error amplifier coupled to the summing node of the decision feedback equalization circuit and coupled to the resistor ladder.

2. The circuit of claim 1, wherein the low pass filter is a resistor and capacitor network.

3. The circuit of claim 1, wherein the circuit is implemented in current mode logic.

4. The circuit of claim 1, wherein the circuit is implemented using differential voltage signals.

5. The circuit of claim 1, wherein the at least one reference signal is configured to be a differential voltage signal.

6. The circuit of claim 1, further comprising an RC matching circuit coupled between the resistor ladder and the error amplifier.

7. The circuit of claim 6, wherein the RC matching circuit is configured to match RC characteristics of aspects of the resistor ladder.

8. The circuit of claim 1, further comprising a switching network configured to alternatively couple one of the at least one reference signals to the error amplifier.

9. The circuit of claim 1, wherein the error amplifier is configured to compare a signal from the summing node and the at least one reference signal.

10. The circuit of claim 1, further comprising a noise filter coupled to the error amplifier.

11. The circuit of claim 1, wherein at least one of the low pass filter, the comparator, the resistor ladder, or the error amplifier is implemented in a programmable logic device.

12. A decision feedback equalization circuit implemented in current mode logic, comprising:
   a low pass filter coupled to a differential summing node of the decision feedback equalization circuit;
   a comparator receiving a first and second input, wherein the first input is a voltage from the low pass filter and the second input is a voltage from a resistor ladder, wherein the comparator is configured to reduce a differential voltage between the first and second inputs;
   a resistor ladder configured to generate the second input and further configured to generate at least one differential reference voltage; and
   an error amplifier coupled to the summing node of the decision feedback equalization circuit and coupled to the resistor ladder to receive the at least one differential reference voltage.

13. The circuit of claim 12, wherein the low pass filter is a resistor and capacitor network.

14. The circuit of claim 12, further comprising an RC matching circuit coupled between the resistor ladder and the error amplifier.

15. The circuit of claim 14, wherein the RC matching circuit is configured to match RC characteristics of aspects of the resistor ladder.

16. The circuit of claim 12, further comprising a switching network configured to alternatively couple one of the at least one differential reference voltages to the error amplifier.

17. The circuit of claim 12, wherein the error amplifier is configured to compare a signal from the summing node and the at least one differential reference voltage.

18. The circuit of claim 12, further comprising a noise filter coupled to the error amplifier.

19. The circuit of claim 12, wherein at least one of the low pass filter, the comparator, the resistor ladder, or the error amplifier is implemented in a programmable logic device.

20. A method for performing decision feedback equalization, comprising:
   performing a low pass filtering operation of a signal from a summing node of the decision feedback equalization circuit;
   comparing a first and second input, wherein the first input is a signal from the low pass filter and the second input is a signal from a resistor ladder, wherein the comparator is configured to reduce a difference between its first and second inputs;
   generating at least one reference signal at the second input;
   comparing the signal from the summing node of the decision feedback equalization circuit and one of the at least one reference signals; and
   generating a response responsive to the comparison step.

21. The method of claim 20, further comprising matching RC characteristics of aspects of the resistor ladder.

22. The method of claim 20, further comprising alternatively coupling one of the at least one reference signals to the error amplifier.

23. The method of claim 20, further comprising filtering noise filter from the error amplifier.

* * * * *